E. YEAMANS.
AUTOMATIC STABILIZER FOR AEROPLANES.
APPLICATION FILED DEC. 16, 1911.
1,040,089.
Patented Oct. 1, 1912.
2 SHEETS—SHEET 1.
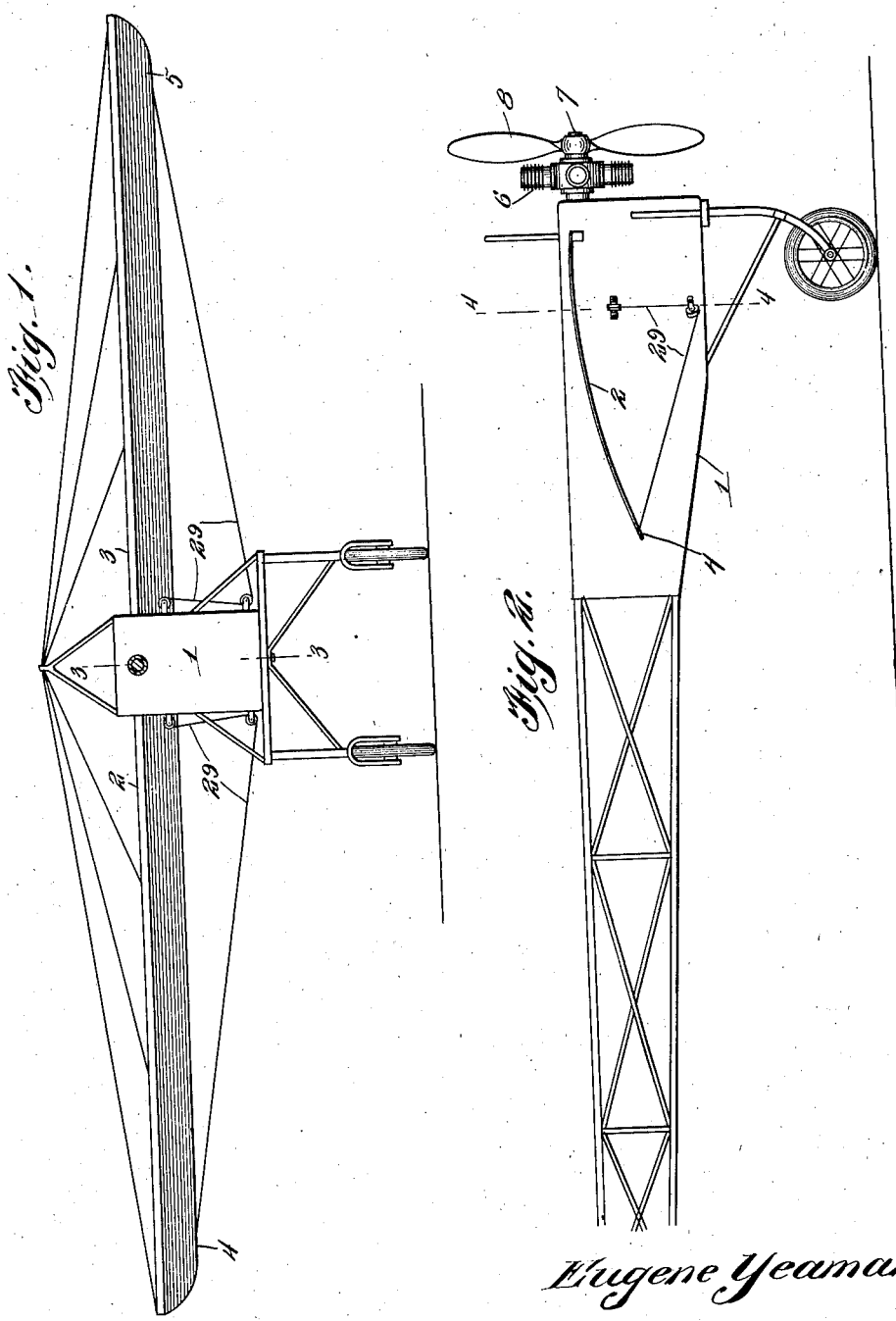
Inventor
Eugene Yeamans
By Victor J. Evans
Attorney
Witnesses
Louis R. Heinrichs
C. C. Hines E. YEAMANS.
AUTOMATIC STABILIZER FOR AEROPLANES.
APPLICATION FILED DEC. 16, 1911.

1,040,089.

Patented Oct. 1, 1912

2 SHEETS—SHEET 2.

Witnesses
Louis R. Heinrichs
C. C. Hines

Inventor
Eugene Yeamans
By Victor J. Evans
Attorney

UNITED STATES PATENT OFFICE.

EUGENE YEAMANS, OF COLLEGEPORT, TEXAS.

AUTOMATIC STABILIZER FOR AEROPLANES.

1,040,089.
Specification of Letters Patent.
Patented Oct. 1, 1912.

Application filed December 16, 1911. Serial No. 666,085.

*To all whom it may concern:*

Be it known that I, EUGENE YEAMANS, a citizen of the United States, residing at Collegeport, in the county of Metagorda and State of Texas, have invented new and useful Improvements in Automatic Stabilizers for Aeroplanes, of which the following is a specification.

This invention relates to an automatic stabilizer for aeroplanes or flying machines of the heavier-than-air class, the object of the invention being to provide simple, reliable and effective gyroscopically-controlled means for correcting any tendency of the machine to tilt unduly on its longitudinal axis, whereby lateral stability will be automatically maintained.

The invention consists of the features of construction, combination and arrangement of parts, hereinafter fully described and claimed, reference being had to the accompanying drawings, in which:—

Figure 3:
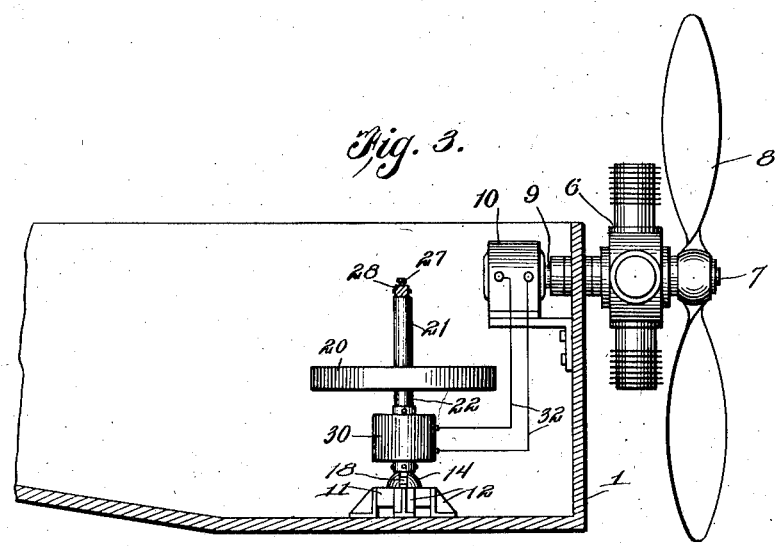
Figure 4:
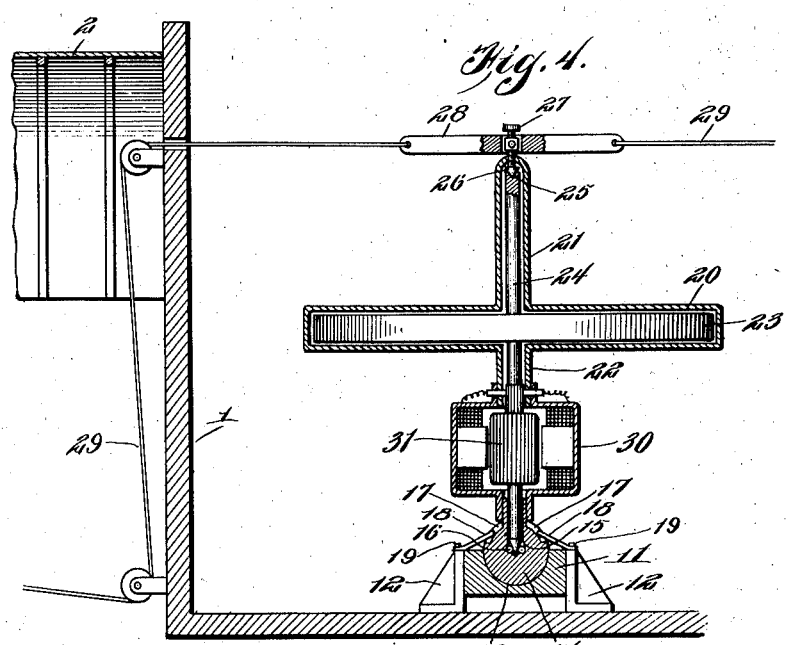

Figure 1 is a front elevation of a monoplane embodying my invention. Fig. 2 is a side elevation of the same. Fig. 3 is a longitudinal section on line 3—3 of Fig. 1. Fig. 4 is a transverse section on line 4—4 of Fig. 2.

In the illustrated exemplification of my invention, I have shown the application of the same to a flying machine of the monoplane type, although it is to be understood that it may be applied to biplanes or other types of flying machines. It will also be understood that while the invention is shown for maintaining lateral control, the gyroscopic device may be arranged to coöperate with one or more horizontal rudders or balancing devices for maintaining longitudinal control.

Referring to the drawings, 1 designates the main frame of the machine, and 2 and 3 the wings forming the supporting surface thereof, which wings are respectively provided with warpable tips or portions 4 and 5, or balancing devices for lateral control. Any equivalents of these wing tips may be employed. A motor 6, herein shown as of the rotary body type, is suitably supported at the front of the main frame, and to the shaft 7 of said motor is connected a propeller 8. To the rotary body of this motor is connected a shaft 9, in gear with an electric generator 10 (dynamo or high tension magnets) whereby said generator is driven. Supported on the frame is a bearing block 11 stayed by braces 12 and provided with a socket 13 in which fits a ball or spherical head 14 formed with a bearing cavity 15 in which are antifriction bearing members 16. This ball is provided with notches 17 engaged by retaining members 18, whereby the ball is permitted to turn or oscillate in a lateral direction only. These retaining members are secured to the block by screws or bolts 19, which also serve as binding posts. Arranged above the ball and socket members 11 and 14 is a normally horizontal casing 20 having tubular top and bottom extensions 21 and 22. In said casing is disposed a gyroscope wheel 23 fixed to a vertical shaft 24, the lower end of which is mounted for rotation in the cavity 15 and in contact with the bearing members 16. The upper end of the shaft is inclosed in the tube 21 and formed with a conical recess 25 receiving a conical bearing member 26 carried by a stem 27 which projects outward through the upper end of said tube 21 and carries a cross piece or head 28. Cords or cables 29 connect the ends of said head or cross piece with the balancing devices 4 and 5, to effect an automatic adjustment in opposite directions when the machine tilts laterally in either direction. The tube 21 of the gyroscope casing is coupled to the ball or head 14 by the casing and fields of an electric motor 30, the armature 31 of which is mounted on the shaft 24, whereby said shaft and the gyroscope wheel are adapted to be driven. Conductors 32 connect the motor fields with the generator 10, through which current is supplied to the motor in the operation of the apparatus.

The gyroscope device is adapted for maintaining the lateral balance of the machine under ordinary conditions of service, and it will be understood from the foregoing description that when the machine is laterally balanced the shaft 24 will be at right angles or perpendicular to any certain normally horizontal portion of the machine structure, whereby the balancing devices 4 and 5 will be positioned at equal distances from the said shaft 24, so that they will be retained in their normal position to adapt the machine to move in a straight horizontal course. When, however, the machine tilts laterally in either direction, a relative angular motion between the machine structure and the gyroscope and its shaft 24 will be established through the movement of the machine about the ball and socket connection, whereby one of the cables 29 will be slackened and the other drawn upon to release one of the balancing devices for upward deflection to decrease its angle of incidence under the action of the air and pull down the other balancing device to increase its angle of incidence. The balancing devices will thereby be adjusted to restore the machine to a normal balance, and when the machine is again laterally balanced the parts will have the relative normal position hereinbefore described, in which the balancing devices are maintained at the same angle of incidence by the gyroscopic device. Thus when the machine is in flight the balancing devices will be controlled automatically to maintain the lateral balance or equilibrium, as will be readily understood.

Any suitable means may be provided for throwing the gyroscope device out of action when desired.

Having thus described the invention, what I claim as new is:

In a flying machine, the combination, with a gliding structure provided with lateral balancing elements, of a bearing member on said gliding structure, a bearing ball mounted to tilt laterally in said bearing member, a vertical shaft journaled at its lower end in the ball and provided at its upper end with a bearing socket, a gyroscope wheel carried by said shaft, a casing inclosing the upper portion of the shaft and having an expanded portion inclosing said gyroscope wheel, an electric motor having its armature mounted on said shaft and its fields inclosed within a casing connecting the lower end of the first-named casing with the ball, a head or cross piece, a conical bearing member connecting the upper end of the first-named casing with said cross-piece and engaging the bearing recess in the shaft, and connections between said head and cross pieces and the balancing elements.

In testimony whereof I affix my signature in presence of two witnesses.

EUGENE YEAMANS.

Witnesses:
G. M. MAGILL,
G. S. HUTCHINSON.